United States Patent
Vos et al.

(10) Patent No.: US 9,449,614 B2
(45) Date of Patent: Sep. 20, 2016

(54) CONTROLLING MULTI-PARTY COMMUNICATIONS

(75) Inventors: Koen Bernard Vos, San Francisco, CA (US); Julian Spittka, San Francisco, CA (US); Henrik Aström, Solna (SE); Karsten Vandborg Sorensen, Stockholm (SE); Soren Skak Jensen, Malmö (SE)

(73) Assignee: Skype, Dublin (IE)

( * ) Notice: Subject to any disclaimer, the term of this patent is extended or adjusted under 35 U.S.C. 154(b) by 1382 days.

(21) Appl. No.: 12/583,184

(22) Filed: Aug. 14, 2009

(65) Prior Publication Data
US 2011/0038362 A1 Feb. 17, 2011

(51) Int. Cl.
H04L 12/16 (2006.01)
H04L 12/66 (2006.01)
G10L 25/78 (2013.01)
G10L 19/012 (2013.01)
H04M 3/56 (2006.01)
H04M 7/00 (2006.01)

(52) U.S. Cl.
CPC ............ G10L 25/78 (2013.01); G10L 19/012 (2013.01); H04M 3/568 (2013.01); H04M 7/006 (2013.01); H04M 2201/18 (2013.01); H04M 2250/62 (2013.01)

(58) Field of Classification Search
CPC . H04L 12/1818; H04L 65/605; H04N 7/152; H04N 7/15; H04N 21/4788; H04W 76/00; H04M 3/56
See application file for complete search history.

(56) References Cited

U.S. PATENT DOCUMENTS 5,861,907 A * 1/1999 Wada .................. 348/14.09
7,079,838 B2 * 7/2006 Thomas et al. ............ 455/416
7,627,629 B1 * 12/2009 Wu et al. .................... 709/204
(Continued)

FOREIGN PATENT DOCUMENTS

CN 1176030 A 3/1998
CN 101102209 A 1/2008
CN 102550008 7/2012
(Continued)

OTHER PUBLICATIONS

Notification of Transmittal of The International Search Report and The Written Opinion of the International Searching Authority, or the Declaration, for PCT/EP2010/061107, mailed on Jan. 5, 2011 (15 pages).
(Continued)

*Primary Examiner* — Melanie Jagannathan
(74) *Attorney, Agent, or Firm* — Tim Wong; Micky Minhas

(57) ABSTRACT

A first user terminal, host terminal, method and program. The first terminal comprises: a transceiver for communicating with a plurality of other user terminals over a communication network; and communications processing apparatus, coupled to the transceiver, and arranged to participate in a call with a selected number of the other user terminals via the transceiver and communication network, the call including transmission of a voice signal from the first user terminal. The communications processing apparatus is operable in a mode whereby it temporarily discontinues transmission of the voice signal in response to detecting less than a predetermined level of activity on said voice signal, and the communications processing apparatus is further configured to selectively enable that mode in dependence on the selected number of other user terminals in the call.

33 Claims, 5 Drawing Sheets

(56) References Cited

U.S. PATENT DOCUMENTS

2005/0124328 A1 6/2005 Thomas et al.
2005/0286466 A1* 12/2005 Tagg et al. .................. 370/329

FOREIGN PATENT DOCUMENTS

| EP | 1 246 395 A1 | 10/2002 |
| JP | 60 204158 A | 10/1985 |
| KR | 2004 0052172 A | 6/2004 |
| WO | WO 2005/009019 A2 | 1/2005 |
| WO | WO2008080426 * | 7/2008 |

OTHER PUBLICATIONS

Willebeek-Lemair, M., et al., "Distributed Video Conferencing Systems" Computer Communications, 20(3):157-168 (May 1, 1997).

"Office Action and search Report Received in China Patent Application No. 201080046088.0", Mailed Date: Dec. 4, 2013, Filed Date: Jul. 30, 2010, 15 Pages.

"Office Action and search Report Received in China Patent Application No. 201080046088.0", Mailed Date: Aug. 6, 2014, Filed Date: Jul. 30, 2010, 18 Pages.

"Foreign Office Action", CN Application No. 201080046088.0, Jan. 21, 2015, 12 pages.

* cited by examiner

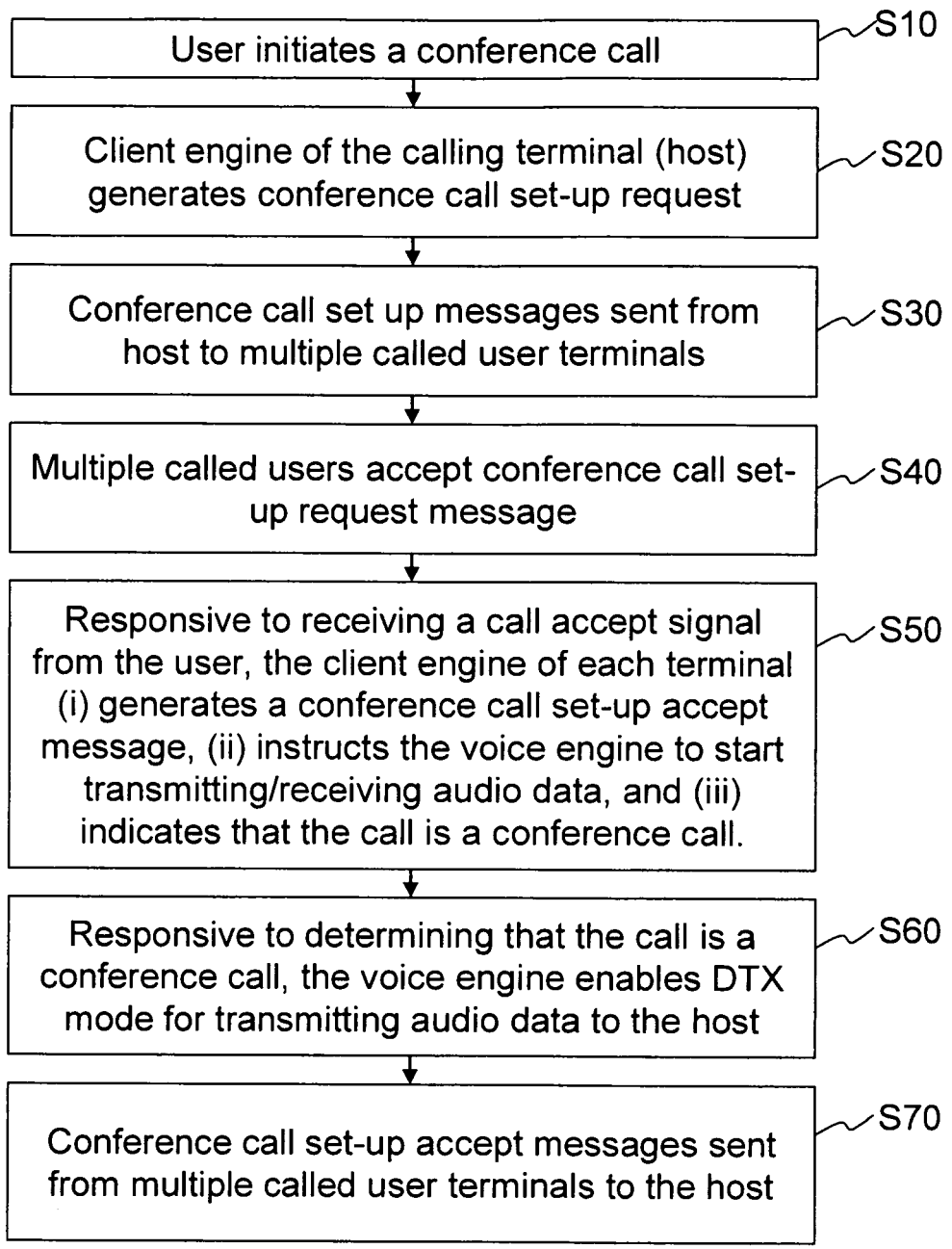

CONTROLLING MULTI-PARTY COMMUNICATIONS

TECHNICAL FIELD

The present invention relates to controlling multi-party communications, e.g. so as to reduce noise, reduce network resource consumption, and/or reduce processing burden on a host terminal.

BACKGROUND

Some communication systems allow the user of a device, such as a personal computer, to communicate across a packet-based computer network such as the Internet. Such communication systems include voice over Internet protocol ("VoIP") systems. These systems are beneficial to the user as they are often of significantly lower cost than conventional fixed line or mobile networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital certificates, without using a server for those purposes. Further details of an example P2P system can be found in WO 2005/009019.

VoIP or other packet-based communications can also be implemented using non-P2P systems that do use centralized call set-up and/or authentication, e.g. via a server or cellular network.

In these and other types of communication system, there is increasing demand for multi-party calls, sometimes referred to as "conference calls". That is, a call involving with multiple other participants, or multiple callees, meaning at least three participants in total. These could be either voice calls or video calls involving a voice element.

However, a difficulty with such calls is that each additional party introduces more noise into the session, and also increases the network resource usage, and increases the processing burden due to mixing the additional data stream at the host terminal. It would be advantageous to mitigate one, some or all of these effects to some extent.

In conferencing scenarios it is known for a conference host to select not to mix audio signals from all participants into the conference mix, as this would introduce an increased noise level from participants that are not actively speaking but are still sending their background noise from the location of their sending terminals. In such cases, the conference host will choose a certain number of most active channels for the conference mix. In order to do this the conference host performs a voice activity detection (VAD) on every individual signal that is received from participating terminals. Many different ways of selecting the most active channels are known and will not be discussed further in detail. Typically a VAD is run for each participating channel on the hosting terminal or server, but it is also possible that VAD information is transmitted from the end-points to the host, along with the payload.

Implementing a VAD process at the host therefore provides one solution to the above problem. However, it may be advantageous to look for other solutions.

SUMMARY

According to one aspect of the present invention, there is provided a first user terminal comprising: a transceiver for communicating with a plurality of other user terminals over a communication network; and communications processing apparatus, coupled to the transceiver, arranged to participate in a call with a selected number of said other user terminals via the transceiver and communication network, the call including transmission of a voice signal from the first user terminal; wherein the communications processing apparatus is operable in a mode whereby it temporarily discontinues transmission of the voice signal in response to detecting less than a predetermined level of activity on said voice signal, and wherein the communications processing apparatus is further configured to selectively enable said mode in dependence on said selected number of other user terminals in the call.

In embodiments, the communications processing apparatus may be configured to selectively enable said mode when said selected number of other user terminals in the call has exceeded a threshold.

The threshold may be one other user terminal, such that the mode may be enabled for any conference call but not for a one-to-one call.

The communications processing apparatus may be configured so as, when temporarily discontinuing the transmission of said voice signal, to do so without transmitting comfort noise or information for remote generation of comfort noise in place of the voice signal.

The communications processing apparatus may be configured such that the transmission of the voice signal by the first user terminal comprises transmitting the voice signal to a hosting one of said other user terminals for mixing with voice signals from the other user terminals.

The communications processing apparatus may be configured to detect a control signal from the host indicating that greater than a specified number of the other user terminals in the call have discontinued transmission of respective voice signals, and to resume transmitting its own voice signal in response to detecting said control signal.

The control signal may indicate that all of the other user terminals in the call have discontinued transmission.

The communications processing apparatus may be configured so as to be operable as a host of a further call with a further selection of said other user terminals, the further call including receipt of a voice signal from each of the selected number of other user terminals in the call.

The communications processing apparatus may be configured so as when operating as a host to detect when there are fewer than a threshold number of active voice signals in the further call, and in response to induce a signal into said further call.

The communications processing apparatus may be configured so as when operating as a host to induce a signal into the further call in response to detecting that there are no active voice signals in the further call.

The communications processing apparatus may be configured such that the inducing of a signal comprises transmitting a control signal instructing one or more of the other user terminals in said further call to resume transmission.

The communications processing apparatus may be configured such the inducing of a signal comprises transmitting comfort noise to one or more of the other user terminals in the further call.

The communications processing apparatus may be configured to enable said mode only on condition that the transmitted voice signal has fallen below the predetermined level of activity for a predetermined length of time.

The communications processing apparatus may be configured so as not to temporarily discontinue transmission unless it detects voice activity from one of the other user terminals in the call.

The communications processing apparatus may comprise a processor and a memory operatively coupled to the processor, the memory storing a communication client application arranged so as when executed by the processor to perform said participation in the call, to be operable in said mode, and to perform said selective enablement of said mode.

The client application may be a VoIP client and said communication network may comprise the Internet.

According to another aspect of the present invention, there is provided a host terminal comprising: a transceiver for communicating with a plurality of other user terminals over a communication network; and communications processing apparatus, coupled to the transceiver, and arranged to host a call with a selected number of said other user terminals via the transceiver and communication network, the call including receipt of a voice signal from each of the selected number of other user terminals in the call; wherein the communications processing apparatus is configured to detect when there are fewer than a threshold number of active voice signals in the call, and in response to induce a signal into said call.

The communications processing apparatus of the host may be configured such that said inducing of a signal into the call is performed in response to detecting that there are no other active voice signals in the call.

The communications processing apparatus of the host may be configured such that the inducing of a signal comprises transmitting a control signal instructing one or more of the other user terminals in said call to resume transmission.

The communications processing apparatus of the host may be configured such that the inducing of a signal comprises transmitting comfort noise to one or more of the other user terminals in the call.

The communications processing apparatus of the host may be configured such that the detection of whether speakers are active comprises detecting whether the other user terminals in the call have temporarily discontinued transmission of their respective voice signals.

The call may include generation of a voice signal at the host terminal, and the communications processing apparatus of the host may be configured such that the detection of whether speakers are active comprises detecting whether the voice signal of the host has fallen below a predetermined level of activity.

According to another aspect of the present invention, there is provided a method comprising: establishing a call between a first user terminal and a selected number of other user terminals via a communication network, the call including transmission of a voice signal from the first user terminal; in dependence on said selected number of other user terminals in the call, selectively enabling a mode of the first terminal whereby, when the mode is enabled, the first terminal temporarily discontinues transmission of the voice signal in response to detecting less than a predetermined level of activity on said voice signal.

The method may comprise further steps in accordance with any program or apparatus disclosed herein.

According to another aspect of the present invention there is provided a computer program product for communicating between a first terminal and a plurality of other user terminals, the program comprising code embodied on a computer readable medium and being configured so as when executed to: establish a call between the first terminal and a selected number of said other user terminals via a communication network, the call including transmission of a voice signal from the first user terminal; in dependence on said selected number of other user terminals in the call, selectively enable a mode of the first terminal whereby, when the mode is enabled, the first terminal temporarily discontinues transmission of the voice signal in response to detecting less than a predetermined level of activity on said voice signal.

The program may be further configured in accordance with any method or apparatus disclosed herein.

BRIEF DESCRIPTION OF THE DRAWINGS

For a better understanding of the present invention and to show how it may be carried into effect, reference will now be made by way of example to the accompanying drawings in which:

FIG. 5 is a flow chart showing a selective DTX process.

DETAILED DESCRIPTION

Figure 1:
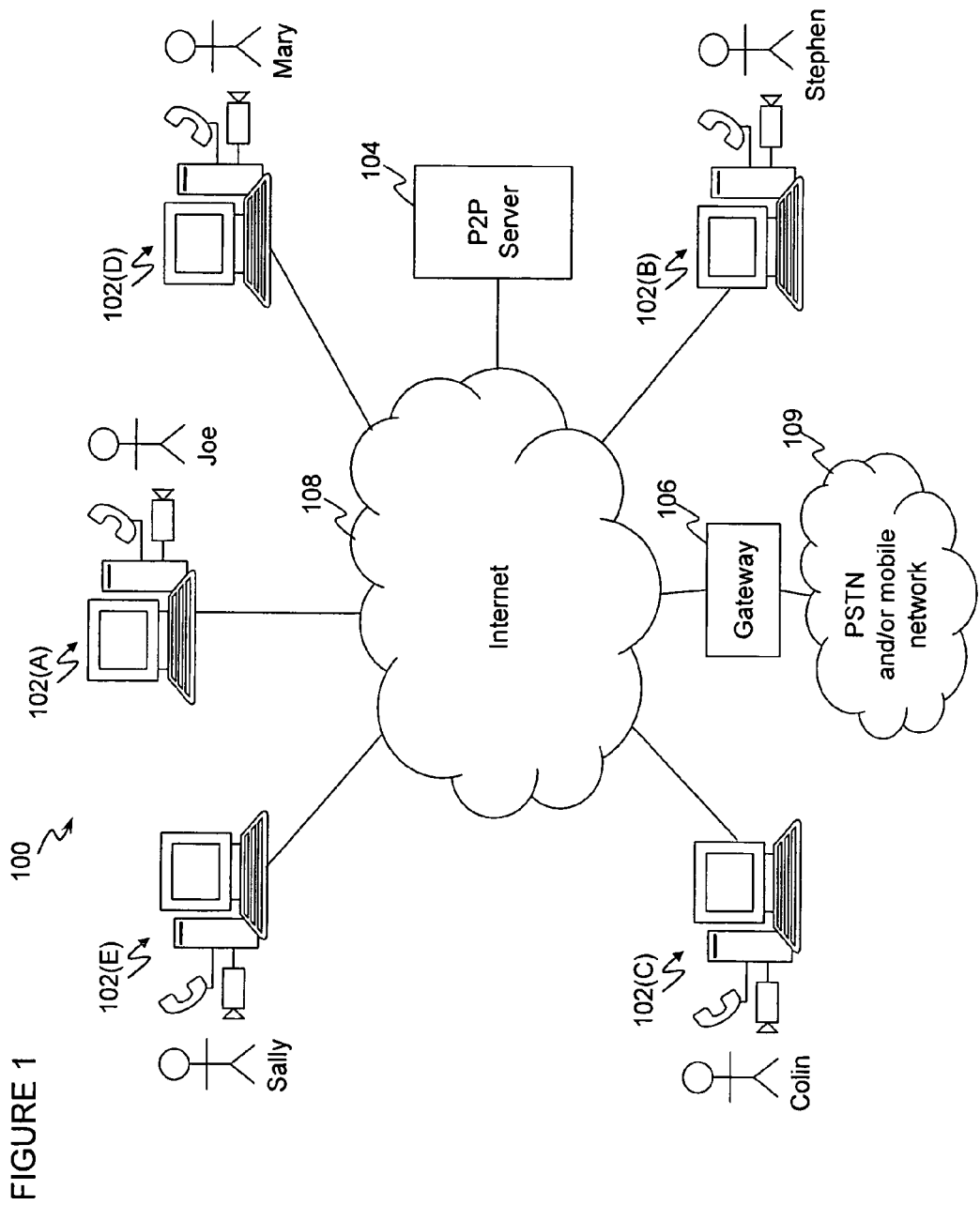
FIG. 1 is a schematic representation of a packet-based network such as the Internet.

Discontinuous transmission (DTX) is a technique whereby the transmission of data is momentarily suspended when there is no voice activity detected in the input audio signal, i.e. when the signal contains only background noise. By reducing the average number of data packets that are transmitted from the terminal, DTX increases capacity and reduces interference in VoIP communication systems. However, in general using DTX typically reduces the decoded output quality, because the gaps during the times when no data is sent need to be filled with artificially generated audio signals to give listeners the feeling that a call is still active. Commonly, comfort noise (CN) is used to fill the gaps during inactive periods. The sending terminal may or may not also send small amounts of side information such as "silence insertion description" (SID) with a regular but reduced frequency. The SID describes the characteristics of the actual background noise at the location of the sending terminal. In cases where no side information is sent, CN needs to be generated on a best effort basis, which may result in an unnatural sounding background noise signal. Further, DTX will reduce the average bandwidth used on a network but will not reduce the peak bandwidth. As such DTX is usually currently only employed on shared networks with limited capacity or when users have limits on how much data they can use over a certain period of time (like a monthly cap).

In preferred embodiments of the present invention, DTX is selectively enabled in dependence on the number of participants in a call. If the number of participants in the call is greater than two (i.e. a conference call) the voice engine selectively enables DTX. This is done to reduce the amount of noise from conference participants in the conference mix and, at the same time, to use network bandwidth in the most efficient way.

Note that where it is said "DTX is enabled" or such like, this means a DTX mode is enabled. When in the DTX mode, transmission of the voice signal is turned on and off in dependence on voice activity at the transmitting terminal. When the DTX mode is off on the other hand, the voice signal is always transmitted regardless of the voice activity (i.e. the transmitting terminal is in continuous transmission, or CTX, mode). That is, for the voice signal to be actually discontinued there are two criteria: first DTX must be enabled, and then the voice signal must be detected to have fallen below the required degree of voice activity.

The inventors have recognised that in the case of conference calls there is a high probability that data sent from a silent call participant will either introduce unwanted noise into the conference mix or be discarded by the conference host's VAD, and that DTX may be advantageously used during conference calls in order to reduce the amount of noise in the conference mix and to reduce the average network usage, without reducing the quality of the signal mixed by the conference host. If however the call is not a conference call then CTX (Continuous Transmission) is enabled and the call quality is not compromised. Further, the preferred embodiments will offload complexity for running voice activity detection (VAD) from the conference host and move it to the other participating terminals of a conference. Instead of running a separate VAD for each participating channel of a conference on the host terminal or server, VAD can be run on the other participating terminals and only a single VAD needs to be performed per terminal. For very large conferences it might still be preferable to select only the most active channels from all received active channels, but complexity can still be reduced by reducing the number of received channels that the host needs to select from.

Note also that, whilst SID is important for conventional VAD/DTX systems as it improves the quality of CN generation, for preferred embodiments of the present invention on the other hand SID is not necessarily needed and therefore it is not desired that this information should be sent over the network. Preferably, it may be omitted altogether.

An exemplary embodiment of the above process will be discussed in more detail shortly. First however, examples of a suitable communication system and client application are described.

FIG. 1 is a schematic illustration of a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs or Internet-enabled mobile phones; one or more P2P servers 104; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Each of a plurality of the end-user terminals 102 is installed with communication software in the form of a P2P client application. When executed, this allows the end-user terminals 102 to establish bidirectional communication channels with other such end-user terminals 102 via the Internet using P2P call set-up (or more generally connection set-up). The P2P client applications also share presence information with one another, which provides an availability status of users. The presence information for each user is preferably, at least in part, defined by the user themselves. To supplement the decentralized call set-up, the P2P client application may retrieve some additional information from the P2P server 104, such as contact lists which provide the names, user IDs of the users' contacts, and "avatars" which are images chosen by users to represent themselves within the P2P system.

There may also be a P2P client application installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

Figure 2:
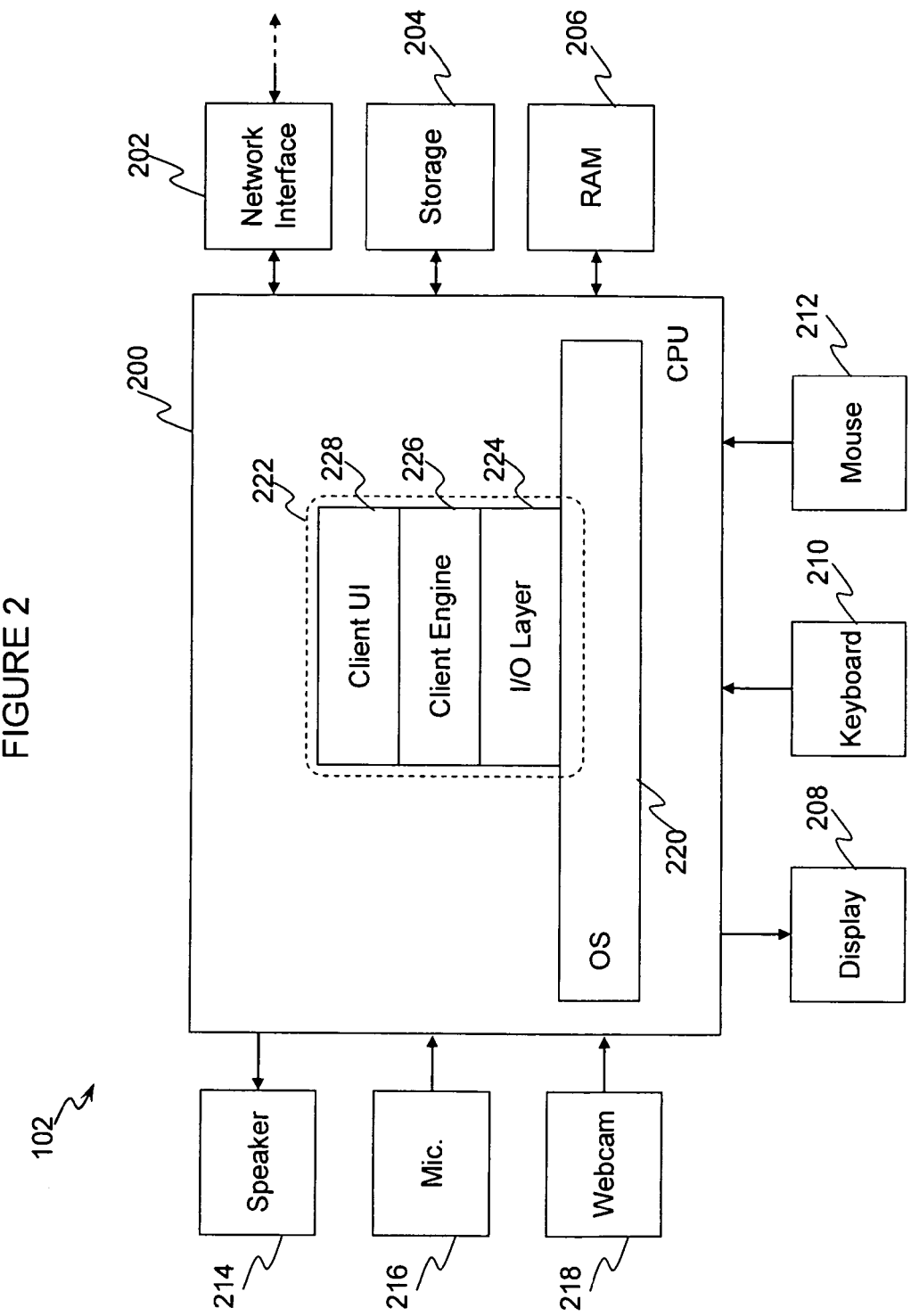
FIG. 2 is a schematic block diagram of a user terminal installed with a P2P client application.

The schematic block diagram of FIG. 2 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. On start-up or reset of the terminal 102, the operating system software 220 is automatically loaded into the RAM 206 and from there is run by being executed on the CPU 200. Once running, the operating system 220 can then run applications such as the P2P client application 222 by loading them into the into the RAM 206 and executing them on the CPU 200. To represent this schematically in FIG. 2, the operating system 220 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The P2P client application 222 is said to be run "on" the operating system 220. This means that in a multi-tasking environment it is scheduled for execution by the operating system 220; and further that inputs to the lowest (I/O) layer 224 of the P2P client application 222 from the input devices 202, 216 and 218 as well as outputs from the I/O layer 224 to the output devices 202, 208 and 214 may be mediated via suitable drivers and/or APIs of the operating system 220.

The I/O layer 224 of the P2P client application comprises a voice engine and optionally a video engine in the form of audio and video codecs which receive incoming encoded streams and decode them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 3:
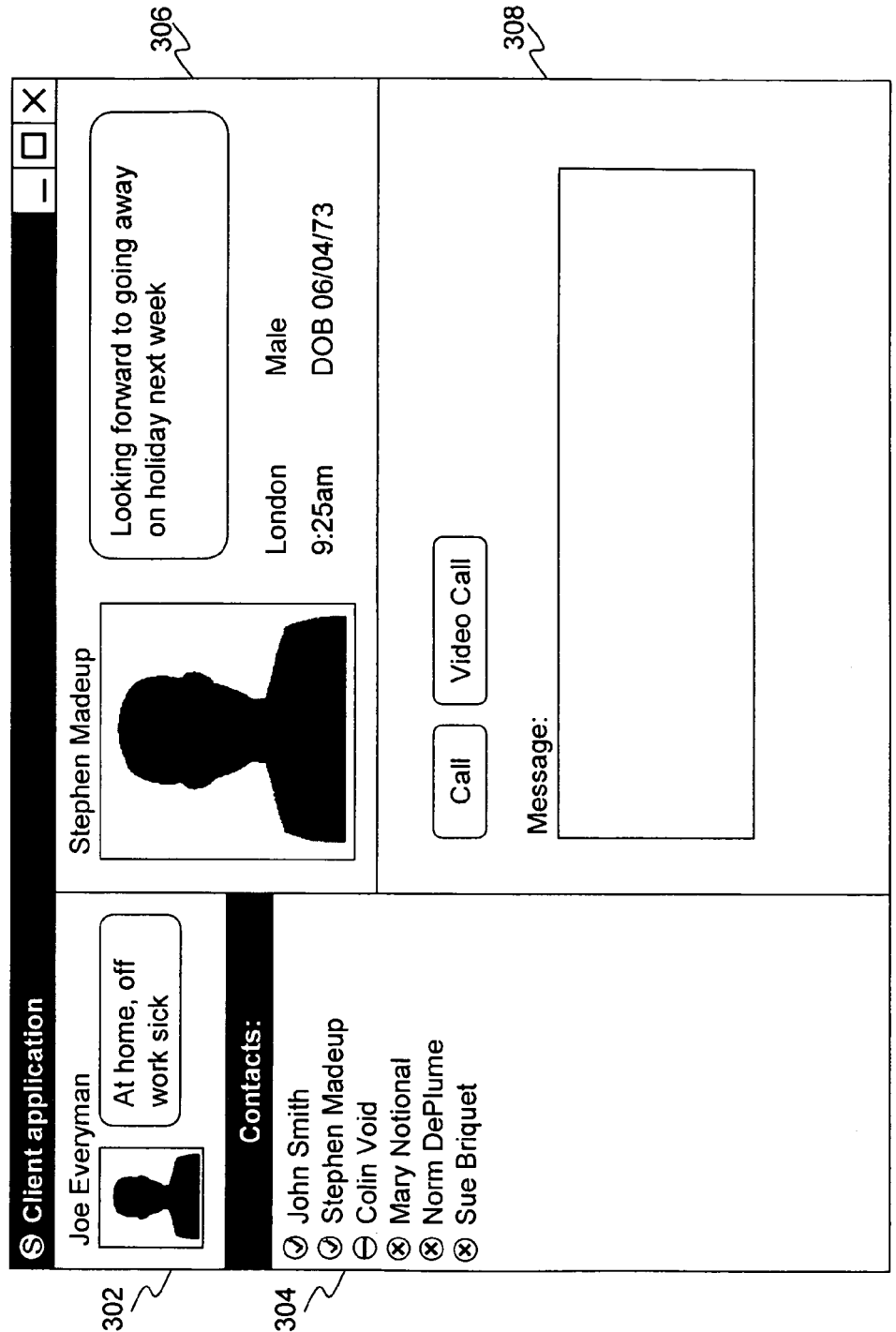
FIG. 3 is a schematic representation of a P2P client application user interface viewed on a user terminal.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface displays a contact list of the user's friends or associates, these being other users of the P2P network. Entry in the contact list is preferably conditional on agreement from the users. The contact list may be stored at and retrieved from the P2P server by the client engine 226, so that the same list is available to the user uses different instances P2P client application on different terminals. Presence information is also displayed in the panel next to each contact. The presence information represents an availability status which preferably comprises an indication of whether the user is online, and preferably is in part user-defined. For example, the presence status may be: the user is offline (x), the user is online and has selected to be shown as available (√), or the user is online but has selected to be shown as not available (−).

A third panel 306 of the user interface displays the profile of a selected user from the contact list, in this case "Stephen Madeup", a user of another user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

In order to initiate a conference call, the user selects multiple contacts from the contact list 304. Alternatively, the user is already in a one-to-one call with one contact and selects one or more other contacts to join the call. Alternatively the user may be one of multiple users called by another user who may have set up the conference call in a similar manner. Usually the user who initiates the call in this manner is also the host, although that need not necessarily be the case.

Figure 4:
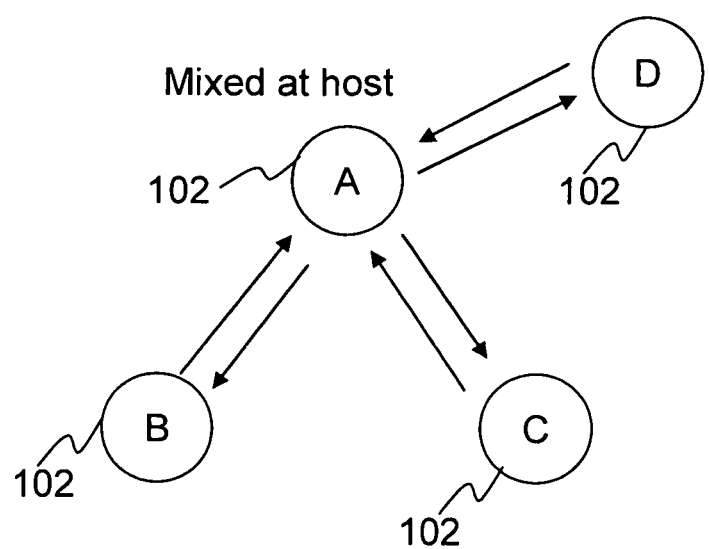
FIG. 4 is a schematic representation of routing involved in hosting a multi-party communication session involving some of the terminals of FIG. 1.

The role of the host terminal in a conference call is now described in relation to FIG. 4. By way of example, FIG. 4 shows schematically four of the user terminals 102(A . . . D) of FIG. 1, in which Joe's user terminal 102(A) is the host. The client running on each user terminal 102(B . . . D) sets up a channel with the host user terminal 102(A), preferably by P2P connection set-up as discussed above, though this could also be by other means such as a centralized server-based set-up. The I/O engine 224 on each terminal's client comprises a voice engine, which is operable to transmit and receive voice signals to and from the other terminal with which it has established a channel. In this manner, each of the other terminals 102(B . . . D) transmits a respective voice signal to the host 102(A). The host receives each of these voice signals, and mixes them all together with its own locally-generated voice signal from the local user (Joe). The host 102(A) then transmits the resulting mixed signal back to all of the other terminals 102(B . . . D) so that they can each hear up to all of the four participants simultaneously (if they are all talking simultaneously).

It will be appreciated that this process can put quite a high processing burden on the host terminal 102(A), and a high bandwidth burden on the host 102(A) and network 108. Also, mixing together all four signals can introduce too much undesirable noise. Even if VAD is used at the host 102(A) to selectively remove one or more channels from the mix (see above), then there is still a processing burden on the host 102(A) in monitoring all of the channels, and still a bandwidth burden on the host 102(A) and network 108 because the voice signals from all other terminals 102(B . . . D) are still transmitted even if subsequently discarded at the host 102(A) by the VAD.

According to the preferred embodiments of the present invention therefore, a technique of selective DTX is provided whereby a DTX mode is selectively enabled at each participating user terminal in dependence on the number of participants in the call. Because the DTX suppresses transmission where there is no significant voice activity, then there is no need for unnecessary transmission of voice signals to the host when the number of participants in the call becomes too large, nor preferably any need for a VAD process to monitor incoming transmissions at the host (though in some cases VAD may be used at the host as well, especially for large conference calls).

An exemplary process will now be described in relation to FIG. 5, for implementation in the video engine 224 and client engine 226 of each client application 222.

At step S10, the user of one of the user terminals such as 102(A) initiates a conference call using their client 222.

At step S20, the client engine 226 of the calling terminal generates conference call set-up request message. The calling terminal 102(A) will preferably be the host, although that need not necessarily be the case.

At step S30, respective instances of the conference call set-up message are sent from host to the multiple called user terminals, e.g. 102(B . . . D), via the network 108. In preferred embodiments this is by P2P connection set-up.

At step S40, assuming the called users want to join the call, then those multiple called users accept the conference call set-up request message via the user-interfaces of their own clients 222, thus generating a respective call accept signal.

At step S50, responsive to receiving the call accept signal from the user, the client engine 226 of each called terminals 102(B . . . D) performs the following sub-steps: (i) it generates a conference call set-up accept message; and (ii) it instructs the voice engine 224 to start transmitting/receiving audio data, and (iii) it indicates to the voice engine 224 that the call is a conference call.

At step S60, responsive to determining that the call is a conference call, the voice engine 224 enables DTX mode for transmitting audio data to host 102(A).

As an alternative to steps S50(*iii*) and S60, at step S50(*iii*) the client engine 226 may indicate to the voice engine 224 the number of other participants in the call, and at step S60 the voice engine 224 may selectively enable the DTX mode in dependence on whether or not that number is above a certain threshold.

At S70 the conference call set-up accept messages sent from multiple called user terminals 102(B . . . D) to the host 102(A).

The conference call channels are thus established for transmitting and receiving voice signals. If the DTX mode is activated at the called user terminals 102(B . . . D), then when at any point one of those called user terminals 102(B . . . D) detects that the respective voice signal it is transmitting has fallen below a certain level of activity, then it temporarily discontinues transmission of that voice signal until it has detected that the activity has increased again. The burden on the network 108 and host 102(A) is thus advantageously reduced. Suitable techniques for voice activity detection are in themselves known in the art, and these can be applied to the selective DTX process of the present invention given the disclosure herein.

At some points during a conference call there may be no active speakers. In order to mitigate the risk of no data being available to decode, measures may be taken to induce some signal into the mix. The detection of whether the voice signals are active could be based for example on a VAD at the host or at the other participants' terminals, performed on the host's and other participants' voice signals; or based on a control signal from the other participating terminals indicating their own activity. These measures may comprise one or more of the following.

In one embodiment of the present invention, a participant's terminal may be arranged so as not to temporarily discontinue transmission unless it detects voice activity coming from the host or one of the other participants. In another embodiment of the invention, the host may be arranged to instruct a participant terminal to switch to continuous transmission (CTX). For example the terminal associated with a current active speaker may be requested to switch to CTX until another active speaker is identified.

In an another embodiment of the invention, each participating terminal may be arranged to stop transmitting packets only after a predetermined duration of inactivity has elapsed.

In a further embodiment of the invention, if the host does not receive any data packets then the host will send comfort noise to the participants of a call.

It will be appreciated that the above embodiments have been described only by way of example.

For instance, the present invention is not limited to any specific standardised meaning of DTX, but can more generally be used with any kind of mode whereby transmission is temporarily suspended in response to detecting some degree of inactivity, e.g. corresponding to silence or approximation of silence, according to any suitable measure.

The term "conference call" does not limit in any way to the information content or purpose of the call, but rather only the number of participants. Thus a conference call refers most generally to a call involving at least three participants.

As mentioned, the host could be the calling party, or alternatively one of the called parties, or the host need not necessarily be a participant of the call at all and could instead be a server or an end-user terminal acting as a non-participating relay. Further, the invention is not limited to a "host" type model, but instead could use other routing techniques.

Different threshold levels could be set for the number of participants that would trigger the selective DTX mode—the best threshold may depend on the particular system or network in question, and could be determined experimentally based on simulations. Further, different thresholds could be set for determining the number of active speakers needed before a signal needs to be induced into the mix— e.g. perhaps only one active speaker might not introduce enough noise to sound natural in the case of a large conference, therefore requiring extra comfort noise even though there is an active speaker.

Although the above has been described mainly in terms of a peer-to-peer (P2P) system, the present invention is not specific to P2P and may be applied to any kind of packet-based communications system, such as more the centralised VoIP systems mentioned previously. Further, the present invention is not limited to use over the Internet, but could be implemented over any packet-based network.

In preferred embodiments, the discontinuous transmission process is implemented by software stored on a general purpose memory such as flash memory or hard drive an executed on a general purpose processor, the software preferably but not necessarily being integrated as part of the client application. However, alternatively the process could be implemented as a separate application, or in firmware, or even in dedicated hardware.

Other configurations and applications of the present invention may be apparent to the person skilled in the art given the disclosure herein. The scope of the invention is not limited by the described embodiments, but only by the appended claims.

What is claimed is:

1. A first user terminal comprising:
a transceiver for communicating with a plurality of other user terminals over a communication network; and
communications processing apparatus, coupled to the transceiver, and arranged to participate in a call with multiple other user terminals of said plurality of other user terminals via the transceiver and communication network, the call including transmission of a voice signal from the first user terminal to a hosting one of said other user terminals for mixing with voice signals from the multiple other user terminals and transmitting the resulting mixed voice signals to the multiple other user terminals;
wherein the communications processing apparatus, in response to receiving a conference call set-up message from the hosting user terminal, is configured to suspend the transmission of said voice signal during periods of the absence of activity of said voice signal in said call, the suspension of transmission being effective to enable the hosting user terminal to suspend voice activity detection for each of said the multiple other user terminals, when the number of participants in the call is above a threshold.

2. The first user terminal of claim 1, wherein the communications processing apparatus is configured so as, when suspending the transmission of said voice signal, to do so without transmitting comfort noise or information for remote generation of comfort noise in place of the voice signal.

3. The first user terminal of claim 1, wherein the communications processing apparatus is configured to detect a control signal from the host indicating that greater than a specified number of the multiple other user terminals in the call have suspended transmission of respective voice signals, and to resume transmitting its own voice signal in response to detecting said control signal.

4. The first user terminal of claim 3, wherein the control signal indicates that all of the other user terminals in the call have suspended transmission.

5. The first user terminal of claim 1, wherein the communications processing apparatus is configured so as to be operable as a host of a further call with further multiple other user terminals of said plurality of other user terminals, the further call including receipt of a voice signal from each of the further multiple other user terminals in the further call.

6. The first user terminal of claim 5, wherein the communications processing apparatus is configured so as when operating as a host to detect when there are fewer than a threshold number of active voice signals in the further call, and in response to induce a signal into said further call.

7. The first user terminal of claim 6, wherein the communications processing apparatus is configured so as when operating as a host to induce a signal into the further call in response to detecting that there are no active voice signals in the further call.

8. The first user terminal of claim 6, wherein the communications processing apparatus is configured such that the inducing of a signal comprises transmitting a control signal instructing one or more of the other user terminals in said further call to resume transmission.

9. The first user terminal of claim 6, wherein the communications processing apparatus is configured such that the inducing of a signal comprises transmitting comfort noise to one or more of the other user terminals in the further call.

10. The first user terminal of claim 1, wherein the communications processing apparatus is configured to suspend transmission of the voice signal only on condition that the voice signal activity has been absent for a predetermined length of time.

11. The first user terminal of claim 1, wherein the communications processing apparatus is arranged so as not to suspend transmission unless it detects voice activity from one of the other user terminals in the call.

12. The first user terminal of claim 1, wherein the communication processing apparatus comprises a processor and a memory operatively coupled to the processor, the memory storing a communication client application arranged so as when executed by the processor to perform said participation in the call, to be operable to detect the absence of voice activity, and to perform said suspension of the transmission of said voice signal.

13. The first user terminal of claim 12, wherein the client application is a VoIP client and said communication network comprises the Internet.

14. A host terminal comprising:
a transceiver for communicating with a plurality of other user terminals over a communication network; and
communications processing apparatus, coupled to the transceiver, and arranged to host a call with multiple other user terminals of said plurality of other user terminals via the transceiver and communication network, the call including sending conference call set-up messages to each of the multiple other user terminals, effective to enable voice activity detection at each of the multiple other user terminals, receiving a voice signal from each of the multiple other user terminals in the call, mixing the received voice signals, and transmitting the resulting mixed voice signals to the multiple other user terminals;

wherein the communications processing apparatus is configured to:

detect the absence of an active voice signal in the call;

determine the number of participants in the call;

responsive to the number of participants in the call exceeding one of a plurality of thresholds, induce a first signal into said call; and responsive to the absence of an active voice signal, induce a second signal into said call.

15. The host terminal of claim 14, wherein the communications processing apparatus is configured such that said inducing of the second signal into the call is performed in response to detecting that there are no other active voice signals in the call.

16. The host terminal of claim 14, wherein the communications processing apparatus is configured such that the inducing of the second signal comprises transmitting a control signal instructing one or more of the multiple other user terminals in said call to resume transmission.

17. The host terminal of claim 14, wherein the communications processing apparatus is configured such that the inducing of the first signal comprises transmitting comfort noise to one or more of the multiple other user terminals in the call.

18. The host terminal of claim 14, wherein the communications processing apparatus is configured such that the detection of whether speakers are active comprises detecting whether the other user terminals in the call have suspended transmission of their respective voice signals.

19. The host terminal of claim 14, wherein the call includes generation of a voice signal at the host terminal, and the communications processing apparatus is configured such that the detection of whether speakers are active comprises detecting whether the voice signal at the host is absent.

20. A method comprising:

establishing a call between a first user terminal and a plurality of other user terminals via a communication network, the call including transmission of a voice signal from the first user terminal to a hosting one of said plurality of other user terminals for mixing with voice signals from the plurality of other user terminals and transmitting the resulting mixed voice signals to the plurality of user terminals;

responsive to receiving a conference call set-up message from the hosting user terminal, the first terminal suspending transmission of said voice signal during said periods of absence of activity of said voice signal in said call, the suspending of the transmission being effective to enable the hosting user terminal to suspend voice activity detection for each of multiple other user terminals, when the number of participants in the call is above a threshold.

21. The method of claim 20, wherein the suspending of the transmission of said voice signal is performed without transmitting comfort noise or information for remote generation of comfort noise in place of the voice signal.

22. The method of claim 20, wherein the transmission of the voice signal by the first user terminal comprises transmitting the voice signal to a hosting one of said other user terminals for mixing with voice signals from the other user terminals.

23. The method of claim 22, comprising detecting that greater than a specified number of the other user terminals in the call have suspended transmission of respective voice signals, and in response resuming transmitting the first terminal's own voice signal.

24. The method of claim 23, comprising detecting that all of the other user terminals in the call have suspended transmission of respective voice signals, and in response resuming transmitting the first terminal's own voice signal.

25. The method of claim 22, comprising detecting when there are fewer than a threshold number of active voice signals in the call, and in response inducing a signal into the call.

26. The method of claim 25, wherein the signal is induced into the call in response to detecting that there are no active voice signals in the call.

27. The method of claim 25, wherein the inducing of a signal comprises transmitting a control signal from the host instructing one or more of the first or other user terminals in the call to resume transmission.

28. The method of claim 25, wherein the inducing of a signal comprises transmitting comfort noise.

29. The method of claim 20, wherein the suspending of the transmission of the voice signal is enabled only on condition that the voice signal has been absent for a predetermined length of time.

30. The method of claim 20, wherein the transmission of said voice signal from the first terminal is not suspended unless voice activity is detected from one of the other user terminals in the call.

31. A computer-readable hardware medium, comprising computer readable instructions for execution by a computer for communicating between a first terminal and a plurality of other user terminals, the instructions being configured so as when executed to:

establish a call between the first terminal and multiple other user terminals of said plurality of other user terminals via a communication network, the call including transmission of a voice signal from the first user terminal to a hosting one of said plurality of other user terminals for mixing with voice signals from the plurality of other user terminals and transmitting the resulting mixed voice signals to the plurality of user terminals;

in response to receiving a conference call set-up message from the hosting user terminal, suspending transmission of said voice signal by the first terminal during periods of the absence of activity of said voice signal in said call, the suspension of transmission being effective to enable the hosting user terminal to suspend voice activity detection for each of the multiple other user terminals, when the number of participants in the call is above a threshold.

32. The computer-readable hardware medium of claim 31, wherein suspension of the transmission of said voice signal is done without transmitting comfort noise or information for remote generation of comfort noise in place of the voice signal.

33. The computer-readable hardware medium of claim 31, wherein the transmission of the voice signal by the first user terminal comprises transmitting the voice signal to a hosting one of said other user terminals for mixing with voice signals from the other user terminals.

* * * * *